US012639834B2

(12) United States Patent
Qin et al.

(10) Patent No.: US 12,639,834 B2
(45) Date of Patent: May 26, 2026

(54) TRAINING METHOD OF A NEURAL NETWORK MODEL FOR CT IMAGE REGISTRATION

(71) Applicant: THE HONG KONG POLYTECHNIC UNIVERSITY, Hong Kong (CN)

(72) Inventors: Jing Qin, Hong Kong (CN); Jing Zou, Hong Kong (CN)

(73) Assignee: The Hong Kong Polytechnic University, Hong Kong (CN)

(*) Notice: Subject to any disclaimer, the term of this patent is extended or adjusted under 35 U.S.C. 154(b) by 230 days.

(21) Appl. No.: 18/647,447

(22) Filed: Apr. 26, 2024

(65) Prior Publication Data

US 2025/0336075 A1     Oct. 30, 2025

(51) Int. Cl.
*G06T 7/33*          (2017.01)

(52) U.S. Cl.
CPC ............ *G06T 7/33* (2017.01); *G06T 2200/04* (2013.01); *G06T 2207/10081* (2013.01); *G06T 2207/20081* (2013.01); *G06T 2207/20084* (2013.01); *G06T 2207/30061* (2013.01)

(58) Field of Classification Search
CPC .................. G06T 7/33; G06T 2200/04; G06T 2207/10081; G06T 2207/20081; G06T 2207/20084; G06T 2207/30061; G06T 7/337; G06T 7/0012; G06N 3/0464; G06N 3/08
See application file for complete search history.

(56) References Cited

U.S. PATENT DOCUMENTS

2015/0242589 A1* 8/2015 Neumann .............. G16H 50/50
                                                         703/2
2017/0337682 A1* 11/2017 Liao ......................... G06T 7/30

* cited by examiner

*Primary Examiner* — Duy M Dang
(74) *Attorney, Agent, or Firm* — S&F/WEHRW

(57)          ABSTRACT

A training method of a deep neural network model for CT image registration, comprising the following steps: providing features of a source image and features of a corresponding target image; generating a deformation field from the source image to the target image; decomposing the generated deformation field into a first deformation field part and a second deformation field part; obtaining a first registration result and a second registration result; generating a surrogate image; obtaining a total loss function, and inputting the total loss function into the deep neural network model, and adjusting the parameters of the deep neural network model until a predetermined number of iterations is achieved, so as to obtain the final deep neural network model.

13 Claims, 3 Drawing Sheets

TRAINING METHOD OF A NEURAL NETWORK MODEL FOR CT IMAGE REGISTRATION

TECHNICAL FIELD

The present disclosure relates to a training method of a neural network model for CT image registration.

BACKGROUND

Lungs are important organs in the human respiratory system, and they are also organs that can be affected by various factors, such as poor air quality or infectious viruses. Computed tomography (CT) is the most commonly used imaging technique to diagnose and treat several lung diseases.

However, imaging of the lungs often differs from CT scan to CT scan because the breathing process deforms the lungs. Lung CT image registration means aligning source CT images with target CT images, which is critical to correct positional shifts in lung structures or tumors to ensure the quality of an intervention. However, this task is very challenging, mainly because of the large deformation of the lungs during different breathing phases.

Recently, deep neural networks have been developed to solve image registration tasks due to their powerful pattern modeling capabilities. The source image and a target image can be used as input. Then the deformation field can be predicted by reducing the appearance (intensity) difference between the target image and the aligned image transformed by the source image. There are currently three ways to enhance current depth registration models.

The first way is to adopt a multi-stage strategy. This strategy is often used in traditional methods to optimize coarse-to-fine registration by registering images of different resolutions. However, this strategy is computationally resource intensive, especially for 3D lung CT registration tasks. The second way is to tap more external supervision to learn, but requires additional information, such as lung masks and landmarks, which are difficult to obtain in clinical practice. The third way is to use recursive cascade networks, which uses multiple cascade networks and learns different parameters for each network, but it is computationally expensive and difficult to train.

SUMMARY

To overcome the shortcomings of existing technology, the present disclosure provides a training method of a neural network mode for CT image registration.

The present disclosure provides a training method of a deep neural network model for CT image registration, comprising the following steps:

providing features of a source image and features of a corresponding target image, the source image is a CT image;

generating a deformation field from the source image to the target image by inputting the features of the source image and the features of the target image into the deep neural network model;

decomposing the generated deformation field into a first deformation field part and a second deformation field part through a decomposition value that sampled from uniform distribution, wherein the first deformation field part is produced by multiplying the decomposition value to the deformation field and the second deformation field part is produced through multiplication and linear interpolation;

obtaining a first registration result and a second registration result by registering the first deformation field part and the second deformation field part, wherein the first registration result is formed by performing a first registration process on the source image by using the first deformation field part, the second registration result is formed by performing a second registration process on the first registration result by using the second deformation field part;

generating a surrogate image by using the source image, the target image and random continuous uniform distribution;

obtaining a total loss function by using the first registration result, the second registration result and the surrogate image, and inputting the total loss function into the deep neural network model to calculate the gradient of the total loss function with respect to the parameters of the deep neural network model, and adjusting the parameters of the deep neural network model by means of minimizing the total loss; and repeating the above steps until a predetermined number of iterations is achieved, so as to obtain the final deep neural network model.

In certain embodiments, the features of the source image represent the intensity $I_S$ of the source image, and the features of the target image represent the intensity $I_T$ of the target image, wherein $I_S \in \mathbb{R}^{H \times W \times C}$, $I_T \in \mathbb{R}^{H \times W \times C}$, wherein H and W represent the height and width of image, and C represents the number of channels of the deep neural network.

In one aspect, the deep neural network f is trained by solving the following function:

$$\underset{f \in F}{\mathrm{argmin}} E_{(I_S, I_T)} \left[ \| I_T - T(I_S \,|\, \Phi_f) \|^2 \right] \qquad (1)$$

wherein F represents the function space of f, $\Phi_f$ refers to the deformation field, T represents transforming the source image transformation by using the deformation field.

In certain embodiments, the source image and the target image are pre-processed, the pre-processing includes at least one of image re-sample, pre-affine registration, and image crop.

In certain embodiments, the deep neural network for learning is a 3D U-Net convolutional neural network, applying 3D convolutions in both the encoder and decoder stages using a kernel size of 3, and a stride of 2.

In certain embodiments, each convolution is followed by a LeakyReLU layer with parameter 0.2.

In certain embodiments, the first deformation field part $\Phi_1$ is produced by multiplying the decomposition value $\xi$ to the deformation field $\Phi$, wherein $\xi$ represents the decomposition value that sampled from uniform distribution U(0,1), for point p, $$\Phi_1(p) = \xi \cdot \Phi(p), \qquad (2)$$

the second deformation field part $\Phi_2$ is produced through multiplication and linear interpolation according to the followings, for the second deformation field part $\Phi_2(p)$ for the point p, $$\Phi_2(p) = \tag{3}$$

$$(1-\xi)\cdot\Phi(p)\circ\xi\cdot\Phi(p) = \sum_{q\in N(p)}(1-\xi)\cdot\Phi(q)\prod_{d\in\{xyz\}}(1-|p_d-q_d|)$$

wherein p represents the pixel point on the source image, N(p) represents the neighbors of pixel point p on the source image, d represents dimensions of the spatial domain of the motion field regarding image; x, y, z represent the direction of the Cartesian coordinate system, q means a neighbor point of p, and the symbol "∘" represents the interpolation operation using Spatial transformation layer execution.

In certain embodiments, the first registration result $$I_R^{\xi}$$

is obtained by performing a deformation operation $T(I_S|\Phi_1)$ on the source image $I_S$ through the first deformation field $\Phi_1$ obtained in the previous step.

In certain embodiments, the second registration result $$I_R^{1-\xi}$$

is obtained by performing the deformation operation $$T\left(I_R^{\xi}\,\middle|\,\Phi_2\right)$$

on the first registration result $$I_R^{\xi}$$

through the second deformation field $\Phi_2$ obtained in the previous step.

In certain embodiments, the intensity feature of the surrogate image $\Phi_\xi$ is set as, $$I_\xi = \xi\cdot(I_T - I_s) + I_s,$$

wherein $\xi$ represents the decomposition value that sampled from uniform distribution U(0,1).

In certain embodiments, the supervision is further set as $$\left\|I_T - I_R^{1-\xi}\right\|^2$$

for determining the calculation effect.

In certain embodiments, the total loss function $L_{total}$ is the weighted sum of the similarity loss $L_{sim}$ and the regularization loss $L_{reg}$, wherein $$L_{total} = L_{sim} + \lambda L_{reg}$$

$$L_{sim} = \frac{1}{|\Omega|}\sum_{p\in\Omega}\left[\left\|I_T - I_R^{1-\xi}\right\|^2 + \left\|I_\xi - I_R^{\xi}\right\|^2\right],$$

$$L_{reg} = \frac{1}{|\Omega|}\sum_{p\in\Omega}\left\|\nabla\Phi(p)\right\|^2,$$

wherein $\lambda$ is the regularization parameter to balance the contributions of similarity loss $L_{sim}$ and regularization loss $L_{reg}$.

In certain embodiments, an optimization algorithm is used to adjust the parameters of the deep neural network model in a manner that minimizes the total loss function.

The present disclosure can achieve good results in different registration tasks with different degrees of deformation, and can achieve perfect effect in large deformation situations and small deformation fields.

BRIEF DESCRIPTION OF THE DRAWINGS

Exemplary embodiments of the disclosure are described in the following with respect to the attached figures. The figures and corresponding detailed description serve merely to provide a better understanding of the disclosure and do not constitute a limitation whatsoever of the scope of the disclosure as defined in the claims. In particular:

DETAILED DESCRIPTION

The disclosure will be more fully described below with reference to the accompanying drawings. However, the present disclosure may be embodied in a number of different forms and should not be construed as being limited to the embodiments described herein.

Embodiments of the present disclosure provide a training method of model, in particular, a training method of a neural network model for CT image registration and the neural network model, to solve the problems that the training takes up a large amount of computing resources and leads to accumulation of errors. The present disclosure further provides a neural network model for a CT image registration, the neural network model is obtained by the above method implemented by a processor. The present disclosure further provides a computer program product that is configured to implement the training method of a neural network model for CT image registration.

The present disclosure first relates to a training method of a deep neural network model for CT image registration, which learns a large deformation field for lung CT image registration by training a neural network model, including randomly decomposing the deformation field, generating intermediate images and final registration images, and updating the neural network model by minimizing the loss function, thereby obtaining a deep network model with better training results.

Figure 1:
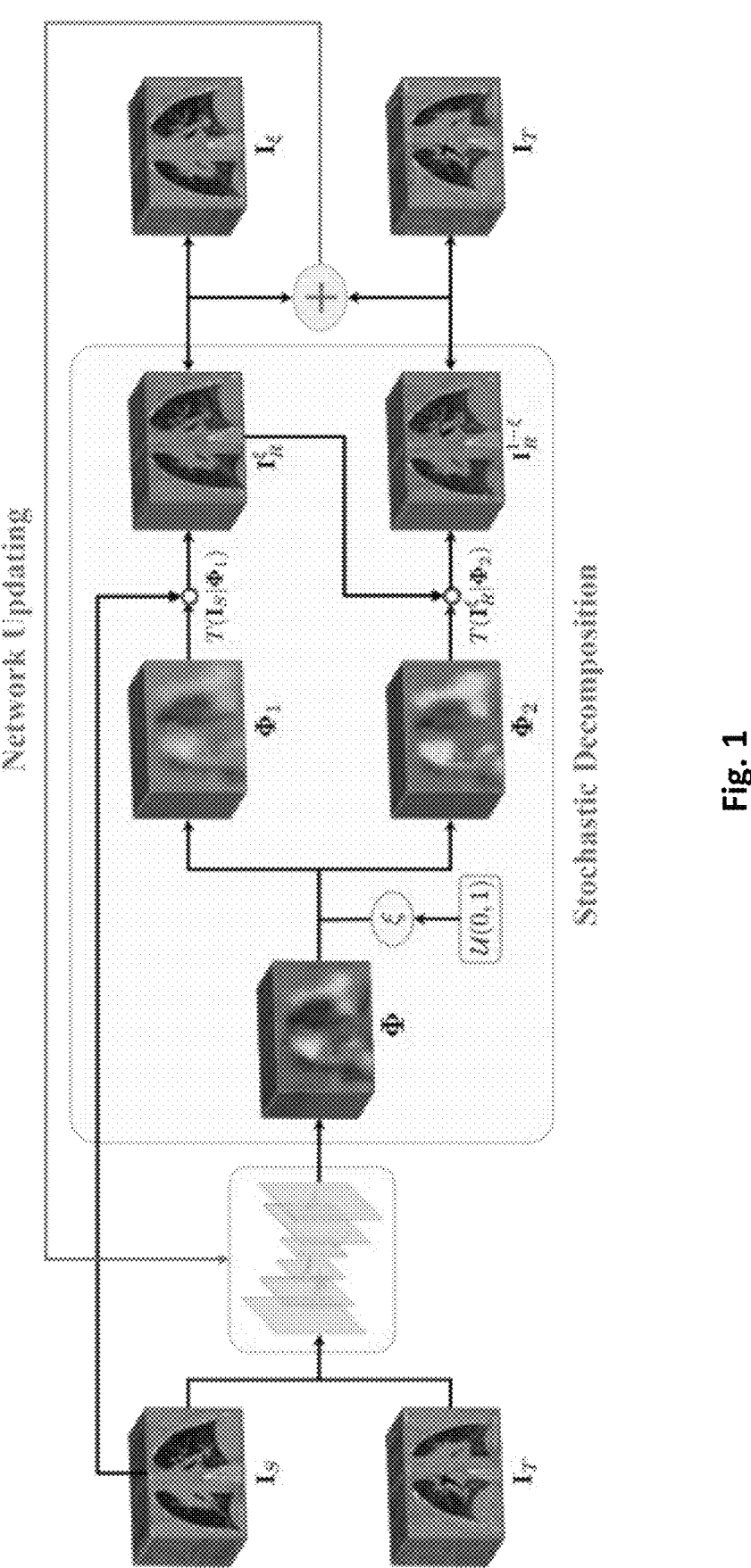
FIG. 1 illustrates a diagram of an exemplary stochastic decomposition according to certain embodiments of the present disclosure.

The training method of a neural network model according to certain embodiments of the present disclosure, as shown in FIG. 1, includes the following steps:

At first, the training method starts from extracting features of multiple initial images including source images and target images obtained by initializing the source images. Initializing the source image includes inputting the source image into the deep neural network model and calculating the initial target image. A concatenation of the source image and the target image is input to the deep neural network model during training for subsequent registration. The source images can be CT images from 3D CT images, such as lung CT images, with feature $I_S$. The target images can also be CT images which have been predetermined for training, with feature $I_T$. Features in the source images can be extracted so as to obtain the features of the images. $I_S \in R^{H \times W \times C}$ and $I_T \in R^{H \times W \times C}$, wherein H and W represent the height and width of the image respectively, and C represents the number of channels. In this embodiment, the intensity at point p (also called pixel point p, pixel p) of the source image is $I_S(p)$ and the intensity at the corresponding point p of the target image is $I_T(p)$.

In certain embodiments, the source image and the target image can be pre-processed, the pre-processing including image re-sample, pre-affine registration, and image crop.

Then, a deformation field $\Phi$ from the source image to the target image can be generated by using the source images and the target images. Specifically, the extracted intensity features $I_S$ and $I_T$ obtained from the last iteration process can be input into the deep neural network f, so as to generate the output predicted deformation field $\Phi$ from $I_S$ and $I_T$, the features of the source image represent the intensity $I_S$ of the source image, and the features of the target image represent the intensity $I_T$ of the target image, $\Phi \in R^{H \times W \times C \times 3}$, wherein H and W represent the height and width of the image, and C represents the number of channels of the deep neural network.

A deformation field $\Phi_f$ is obtained by inputting the intensity $I_S$ of the source image and the intensity $I_T$ of the target image into the deep neural network f. The final deep network model is obtained by applying the following equation (1) to the deep neural network f.

$$\underset{f \in F}{\operatorname{argmin}} E_{(I_S, I_T)}\left[\|I_T - T(I_S | \Phi_f)\|^2\right]. \qquad (1)$$

That means, as per the above function, the set of points f can be obtained for which $E_{(I_S, I_T)}[\|I_T - T(I_S|\Phi_f)\|^2]$ attains the function's smallest value (if it exists), for the input $(I_S, I_T)$. $\Phi_f$ is deformation field at f, wherein F represents the function space of f, which is specified by the deep neural network. E refers to the expectation operation. The function T represents image transformation, that is, the source image is transformed through the learned deformation field. The deformation field is the output of the deep neural network. The deformation field is represented by a matrix formed by the vector of the displacement and direction of each pixel. The deformation field is initially obtained by mapping the initial source image and the target image. Then in the iteration step, the deformation field is output through the deep neural network learned after the previous iteration step. The features of the lung CT images, such as $(I_S, I_T)$, are fed to the deep neural network f, and its output is the deformation field $\Phi$. Function T means image transformation, in this formula, T means transform source image with the learned deformation field.

The deep neural network for learning is a 3D U-Net convolutional neural network, applying 3D convolutions in both the encoder and decoder stages using a kernel size of 3, and a stride of 2. Each convolution is followed by a LeakyReLU layer with parameter 0.2. Therefore, initially, the intensity $I_S(p)$ at point p of the source image and the intensity $I_T(p)$ at the corresponding point p of the target image are input into the 3D U-Net convolutional neural network to obtain the initial deformation field $\Phi(p)$. In the subsequent steps, the intensity $I_S(p)$ at point p of the image and deformation field $\Phi(p)$ obtained in the previous step are used to obtain the intensity feature of corresponding p of the target image.

In certain embodiments, initially both the intensity $I_S$ of the source image and the intensity $I_T$ of the target image are put into the 3D U-Net convolutional neural network, the image size is 240×160×96. Then the output of the calculation through the 3D U-Net convolutional neural network is the deformation field. The size of the deformation field is 240×160×96×3, it represents the transformation between the source image and the target image.

Then the deformation field $\Phi$ is decomposed into two parts according to $\xi$, i.e. a first deformation field part $\Phi_1$ and a second deformation field part $\Phi_2$, such as $\Phi_1(p)$ and $\Phi_2(p)$ at a point p, wherein $\xi$ represents a decomposition value that sampled from uniform distribution U(0,1), in the range between 0 and 1. As shown in FIG. 1, the stochastic decomposition has been shown.

The first deformation field part $\Phi_1$ can be obtained by multiplying the deformation field $\Phi$ to the decomposition value $\xi$, as shown in the following formula (2) for point p, $$\Phi_1(p) = \xi \cdot \Phi(p), \qquad (2)$$

the obtained first deformation field part $\Phi_1(p)$ is the decomposed deformation field for point p, with the size of 240×160×96×3.

The second deformation field part $\Phi_2$ represents the deformation starting from the decomposition phase rather than the source image $I_S$. In such embodiments, $\Phi_2(p)$ for point p is produced by using the decomposition value $\xi$ that sampled from uniform distribution U(0,1) and linear interpolation as shown in the following formula (3).

$$\Phi_2(p) = \qquad\qquad\qquad (3)$$
$$(1 - \xi) \cdot \Phi(p) \circ \xi \cdot \Phi(p) = \sum_{q \in N(p)} (1 - \xi) \cdot \Phi(q) \prod_{d \in \{x,y,z\}} (1 - |p_d - q_d|),$$

wherein p refers to one pixel (point), N(p) refers to the neighbors of pixel p, d represents dimensions of the spatial domain of the motion field regarding the image, it means (x, y, z), which refers to 3 in the embodiment, x, y, z means the directions of Cartesian Coordinate System, q means a neighbor point of p. For example, $p_d$ can refer to (1.2, 1.3, 1.5), where d refers to 3, in this case, $q_d$ means (1, 1, 1). The symbol "∘" refers to an interpolation operation which is performed by using a spatial transformer layer.

In certain embodiments of the present disclosure, the decomposition value $\xi$ can be sampled from uniform distribution U(0,1). Further it is appropriately selected from other possible ranges: U(0.05, 0.95), U(0.10, 0.90) and U(0.20, 0.80). In certain embodiments, the range U(0.05, 0.95) is selected as the default value.

Then, after decomposition, a first registration result and a second registration result are obtained by registering the first deformation field part and the second deformation field part through image warping according to the following formula (4) and (5), $$I_R^{\xi} = T(I_s \mid \Phi_1), \tag{4}$$

$$I_R^{1-\xi} = T\big(I_R^{\xi} \mid \Phi_2\big). \tag{5}$$

By using the feature of the source image $I_S$ and the first deformation field part $\Phi_1$, the first registration result $$I_R^{\xi},$$

i.e. the first intermediate image, can be obtained, by performing the deformation operation $T(I_S \mid \Phi_1)$ on $I_S$ through $\Phi_1$ obtained in the previous step. Then based on the second deformation field part $\Phi_2$ and the first registration result $$I_R^{\xi},$$

the second registration result $$I_R^{1-\xi},$$

i.e. the second intermediate image, can be obtained, by performing the deformation operation $$T\big(I_R^{\xi}|\Phi_2\big)$$

on the first registration result $$I_R^{\xi}$$

through $\Phi_2$ obtained in the previous step.

The supervisions for the registration results $$I_R^{\xi} \text{ and } I_R^{1-\xi}$$

is assigned. Specifically, for warped intermediate image $$I_R^{1-\xi},$$

as it is deformed by the decomposed deformation field $\Phi_2$ from the first intermediate image $$I_R^{\xi}, \left\| I_T - I_R^{1-\xi} \right\|^2$$

can be used as the supervision. The supervision means the intensity similarity between the target image and the registration results, and thus is used to decrease the dis-similarity loss during the learning. As the expected value is $I_T$, for the first intermediate image $$I_R^{\xi},$$

a surrogate supervision is produced at the decomposition phase. After decomposition, $\Phi_1$ represents the deformation from $I_S$ to $$I_R^{\xi}.$$

As $\Phi_1$ fulfills its corresponding optimization duty $\|\xi \cdot (I_T - I_S)\|^2$ is expected, a surrogate image $I_\xi$ can be designed.

$$I_\xi = \xi \cdot (I_T - I_s) + I_s, \tag{6}$$

which has corresponding intensity discrepancy at the decomposition phase. Thus $$\left\| I_\xi - I_R^{\xi} \right\|^2$$

can be used as the supervision for $$I_R^{\xi},$$

the registration results are learned by decreasing the supervision results.

Then the combination of the first registration image $$I_R^{\xi}$$

and of the second registration image $$I_R^{1-\xi}$$

are incorporated to form the target image. The neural network model can be updated with a supervision of target image, so as to obtain the final neural network model for CT image registration after updating the neural network model for the predetermined iteration number. The predetermined iteration number is set before the training.

Loss Function

In order to minimize the difference between the predicted image and the target image, the intensity difference mentioned above is simultaneously measured as a similarity loss $L_{sim}$:

$$L_{sim} = \frac{1}{|\Omega|} \sum_{p \in \Omega} \left[ \left\| I_T - I_R^{1-\xi} \right\|^2 + \left\| I_\xi - I_R^{\xi} \right\|^2 \right] \tag{7}$$

where $\Omega$ is the domain on which the images are defined and p donates a pixel in images, $$I_R^{\xi}$$

refers to the first registration image, $$I_R^{1-\xi}$$

refers to the second registration image, $I_{\xi}$ refers to the surrogate image, $I_T$ refers to the target image.

For a dense deformation field, it is regularized so as to avoid folding or discontinuity, and the smoothness of the deformation field $\Phi$ is kept. The regularization loss, also called smooth loss, $L_{reg}$, is used to regularize the spatial gradients of the deformation field as follows.

$$L_{reg} = \frac{1}{|\Omega|} \sum_{p \in \Omega} \|\nabla \Phi(p)\|^2 = \frac{1}{3|\Omega|} \sum_{p \in \Omega} \sum_{i=1}^{3} \left(\Phi(p + \vec{e}_i) - \Phi(p)\right)^2 \quad (8)$$

wherein $\vec{e}_1$ means $\vec{e}_1$, $\vec{e}_2$ and $\vec{e}_3$, which form the natural basis of the set of all 3D vectors $R^3$, and $\Omega$ is the image domain.

Finally, the total loss function $L_{total}$ is the weighted summation of similarity loss $L_{sim}$ and regularization loss $L_{reg}$, which is illustrated as follows.

$$L_{total} = L_{sim} + \lambda L_{reg} \quad (9)$$

wherein $\lambda$ is a regularization parameter to balance the relative contributions between similarity loss and regularization loss.

The network model is updated by minimizing two dis-similarity losses 1) dis-similarity between the final result and the target image; 2) dis-similarity between the first registration image and the surrogate image.

In certain embodiments, the process of training a deep neural network model is as follows, First, during each training iteration, the current parameters of the deep neural network model, namely the weights and biases, are used to make predictions on the training data.

Then, forward propagation is used to pass the input data through the network. The output of a deep neural network model is compared to the true output using a total loss function that measures the difference between the predicted target value of the deep neural network model and the actual target value. For example, in a regression problem, the mean square error (MSE) can be used as the loss function, which calculates the average squared difference between the predicted and actual values. In this embodiment, the weighted sum of the similarity loss $L_{sim}$ and the regularization loss $L_{reg}$ is used as the total loss function.

Then, the gradient of the loss function is calculated with respect to each weight and bias of the deep neural network model, indicating how much the loss changes if these parameters are adjusted. In this example, this is accomplished through a process called backpropagation. These gradients indicate how much each parameter contributes to the total loss.

Optimization algorithms such as gradient descent, such as stochastic gradient descent (SGD) or Adam, are then typically used to adjust the parameters of the deep neural network model in a way that minimizes the total loss. In the present embodiment, it is done by subtracting the loss gradient for each parameter multiplied by the learning rate.

This process is repeated for a predetermined number of iterations or epochs, or until the total loss on the validation set stops decreasing, allowing network performance to improve.

TABLE 1

| |
| --- |
| Inputs: The source image $I_S$, the target image $I_T$, |
|     and the number of iterations. |
| while not end of training iteration do |
|   % Deformation Field Decomposition % |
|   $\Phi \leftarrow$ 3D UNet($I_S$, $I_T$)       $\triangleright$ produce deformation field |
|   $\xi \leftarrow U(0, 1)$       $\triangleright$ sample $\xi$ from uniform distribution |
|   $\Phi'(x, y, z, i) = \Phi(x + \xi \cdot \Phi(x, y, z, 1), y + \xi \cdot \Phi(x, y, z, 2), z + \xi \cdot \Phi(x, y, z, 3), i)$ |
|   $\Phi_1 = \xi \cdot \Phi$ |
|   $\Phi_2 = (1 - \xi) \cdot \Phi'$ |
|   % Surrogate Supervision % |
|   $I_R^{\xi} = T(I_s \,|\, \Phi_1)$       $\triangleright$ generate intermediate warped image |
|   $I_R^{1-\xi} = T(I_R^{\xi} \,|\, \Phi_2)$       $\triangleright$ generate final warped image |
|   $I_{\xi} = \xi \cdot (I_T - I_s) + I_s,$       $\triangleright$ generate surrogate image |
|   $\|I_{\xi} - I_R^{\xi}\|^2$       $\triangleright$ supervision with surrogate image |
|   $\|I_T - I_R^{1-\xi}\|^2$       $\triangleright$ supervision with target image |
|   % Loss Calculation % |
|   $L_{sim} = \|I_T - I_R^{1-\xi}\|^2 + \|I_{\xi} - I_R^{\xi}\|^2$       $\triangleright$ similarity term |
|   $L_{reg} = \frac{1}{|\Omega|} \sum_{p \in \Omega} \|\nabla \Phi(p)\|^2$       $\triangleright$ regularization term |
| end while |

The pseudocode of the random decomposition algorithm is shown in Table 1.

In summary, firstly a deformation field can be produced from input image pairs, then a number randomly can be sampled from 0 to 1 and used to decompose the deformation field into two small fields. After that, the warped intermediate image and final image can be generated through image warping using these two fields. Finally, a surrogate image, that has corresponding intensity discrepancy at the decomposition point, can be constructed and used as supervision to update the network together with the supervision of target image.

Due to random decomposition, the errors in the surrogate image are different for each iteration in the deep neutral network training, so these errors will be eliminated after multiple iterations. In addition, another supervision can be built from real target images, and this real supervision can correct the network's learning. The random decomposition according to the present disclosure can avoid being misled by random errors and improve registration performance.

Figure 2:
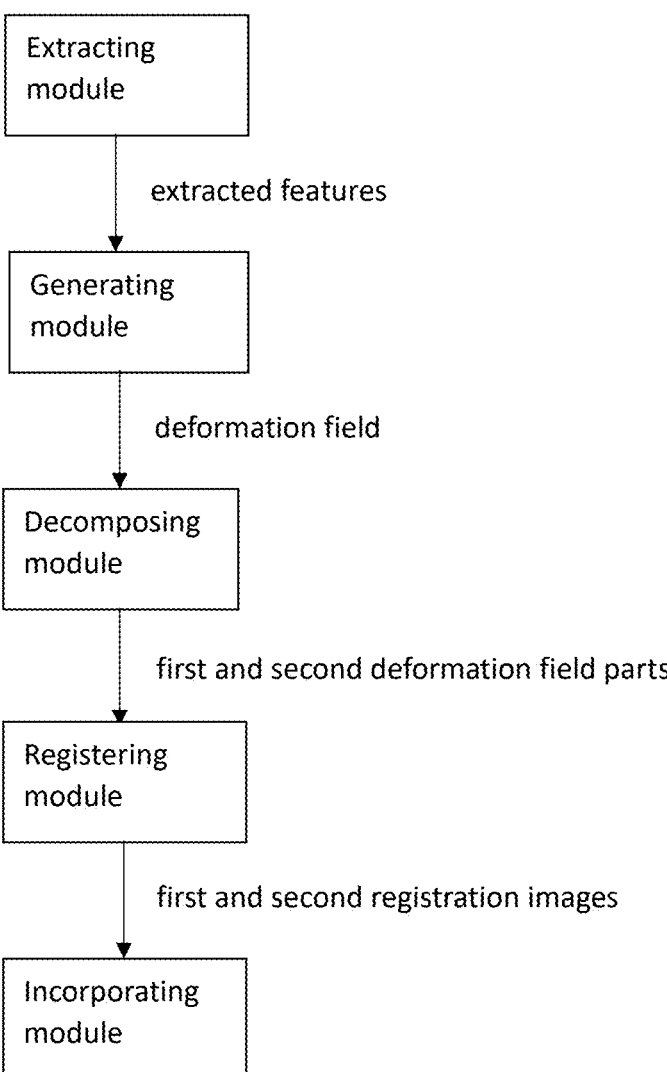
FIG. 2 illustrates a diagram of a model training device according to certain embodiments of the present disclosure.

In certain embodiments of the present disclosure provides a model training device. The model training device as shown in FIG. 2 is configured to implement a training method of a neural network model for CT image registration as described above, and comprises the following modules.

An extracting module is configured to extract features of a source image and features of a preset target image, the source image is a CT image.

A generating module is configured to receive the extracted features from the extracting module, and generate a deformation field from the source image to the target image by inputting the extracted features of the source image and the extracted features of the target image into a deep neural network.

After generating the deformation field, such deformation field is input to a decomposing module. The decomposing module is configured to decompose the received deformation field into a first deformation field part and a second deformation field part through at least random continuous uniform distribution, wherein the first deformation field part is produced through random continuous uniform distribution, and the second deformation field part is produced through random continuous uniform distribution and linear interpolation.

Then the first and second deformation field parts is input into a registering module. The registering module is configured to register the first deformation field part and the second deformation field part to obtain a first registration result and a second registration result, wherein the first registration result is formed by performing a first registration process on the source image by using the first deformation field part, the second registration image is formed by performing a second registration process on the first registration result by using the second deformation field part.

A surrogate module is configured to generate a surrogate image by using the source image, the target image and random continuous uniform distribution.

A total loss function module is configured to obtain a total loss function by using the first registration result, the second registration result and the surrogate image, and inputting the total loss function into the deep neural network model to calculate the gradient of the total loss function with respect to the parameters of the deep neural network model, and adjusting the parameters of the deep neural network model by means of minimizing the total loss.

An iteration module is configured to repeat the above steps until a predetermined number of iterations is achieved, so as to obtain the final neural network model for CT image registration.

The method and device according to the present disclosure can achieve good results in different registration tasks with different degrees of deformation, and can achieve perfect effect in large deformation situations and small deformation fields, because intermediate image supervision is added and the standard registration is not changed frame. Such agent supervision can improve learning performance, no matter how large of the image is.

Example 1

The deep neural network model of the present disclosure is implemented by processing the data in the DirLab 4DCT data set. The DirLab 4DCT data set contains 100 lung CT volumes collected from 10 patients, each with 10 CT volumes, denoted as $T_0, \ldots, T_9$ respectively, sampled at 10 different respiratory phases throughout the respiratory cycle. The dataset also provides 300 anatomical landmarks for volumes $T_0$ and $T_5$, representing maximal inspiration and maximal expiration, and 75 anatomical landmarks for the remaining volumes.

Figure 3:
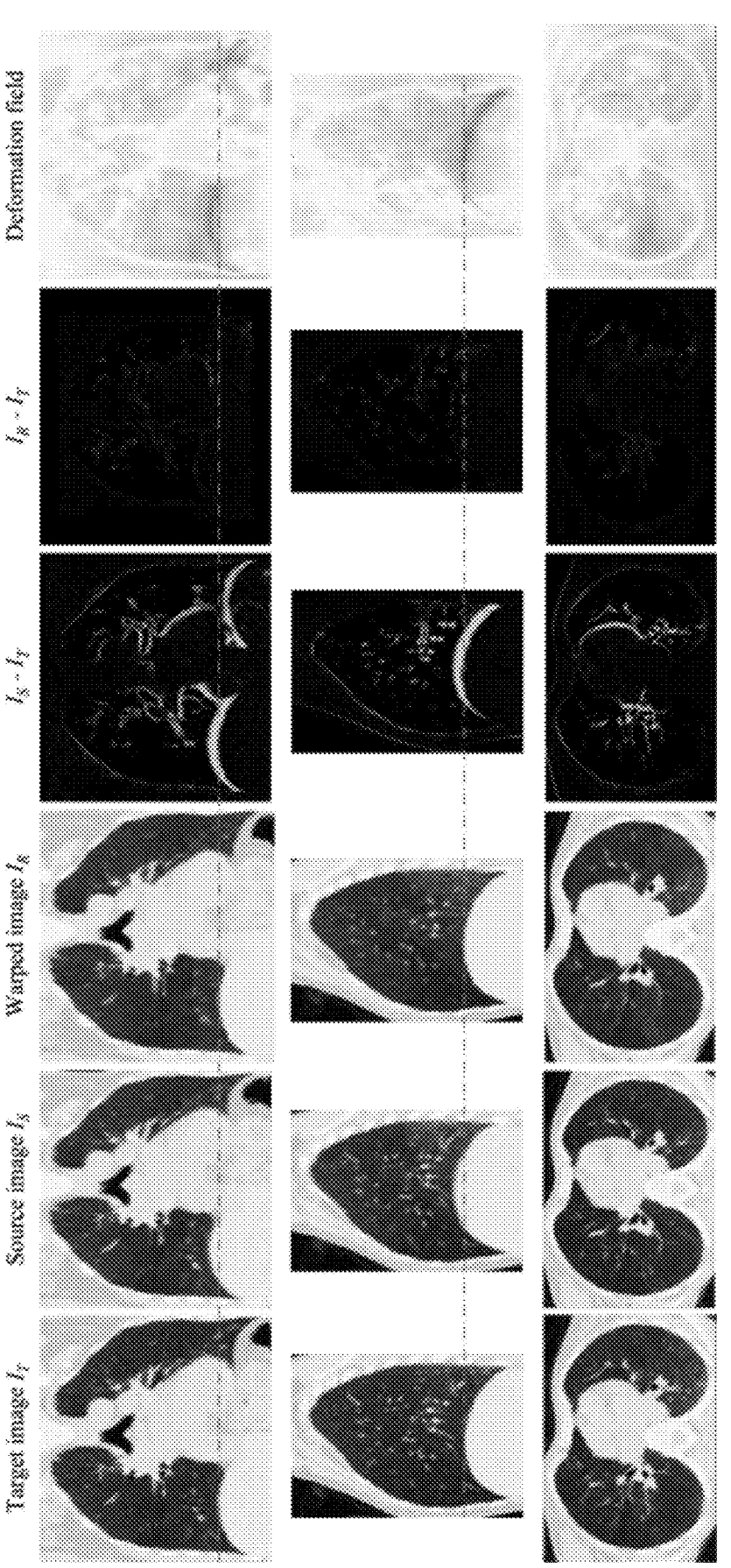
FIG. 3 illustrates a diagram of an exemplary images obtained according to an example of the present disclosure.

The deep neural network model of the present disclosure trained by processing the data in the DirLab 4DCT data set achieves perfect performance, as shown in FIG. 3. In this example, the epoch is set as 600. The target registration error (TRE) as the performance metric, measures the performance of an algorithm by evaluating the average Euclidean distance and registration results of landmarks on the target image. The smaller the value, the better the registration output.

TABLE 2

Comparison of TRE (mm) results of the method of registering $T_0$ to $T_5$ according to the present disclosure and other methods
$T_0 \rightarrow T_5$

|  | Ave. | Best | Worst | p-value |
|---|---|---|---|---|
| SyN | 4.26 ± 1.18 | 2.28 | 6.33 | 0.002 |
| BL | 3.53 ± 1.38 | 1.97 | 6.02 | 0.020 |
| IL | 3.85 ± 1.25 | 2.19 | 5.93 | 0.003 |
| VM | 3.38 ± 1.17 | 2.19 | 5.79 | 0.042 |
| MAC | 3.53 ± 1.25 | 2.19 | 6.27 | 0.005 |
| CM | 3.56 ± 1.56 | 1.97 | 6.77 | 0.043 |
| RC | 5.02 ± 1.30 | 2.85 | 7.49 | <0.001 |
| Ours | 3.28 ± 1.19 | 2.11 | 5.53 | — |

TABLE 3

Comparison of TRE (mm) results of the method of registering $T_5$ to $T_0$ according to the present disclosure and other methods.
$T_5 \rightarrow T_0$

|  | Ave. | Best | Worst | p-value |
|---|---|---|---|---|
| SyN | 4.31 ± 1.78 | 1.97 | 7.96 | 0.011 |
| BL | 3.68 ± 1.53 | 2.08 | 6.13 | 0.041 |
| IL | 3.87 ± 1.05 | 2.71 | 5.80 | 0.002 |
| VM | 3.58 ± 1.39 | 2.13 | 6.25 | 0.034 |
| MAC | 3.62 ± 1.38 | 2.19 | 6.07 | 0.024 |
| CM | 3.78 ± 1.42 | 2.31 | 6.73 | 0.006 |
| RC | 4.88 ± 1.29 | 3.07 | 7.27 | <0.001 |
| Ours | 3.14 ± 1.16 | 2.11 | 6.01 | — |

It can be seen that the algorithm according to the Example 1 of the present disclosure achieves the best performance in terms of average TRE results (denoted by Ave. in the Table 1 and Table 2) on both registration tasks. It can also be seen that the algorithm according to the invention always performs well in the best and worst cases (indicated by "Best" and "Worst" in the table).

Qualitative results of the Example 1 of the present disclosure are shown in FIG. 3. In this figure, the target image, the source image, the warped image, the difference image $I_S$–$I_T$ by subtracting the target image from the source image, the difference image $I_R$–$I_T$ by subtracting the target image from the registration result image according to the method of the Example 1 of the present disclosure, and the deformation field is presented from three different perspectives. From the images $I_S$–$I_T$ in the fourth column, it can be seen that larger deformations occur mainly in the diaphragm and the area close to the heart, shown in white. After registration, the difference between registered images and the target images is shown in the fifth column. In these images, comparing to the images in the fourth column, the large deformations are all eliminated. The horizontal dashed lines are added in the figure to highlight the position of the diaphragm.

After registration, the difference between the registered image and the target image is shown in the fifth column. In these images, large distortions are eliminated compared to the images in the fourth column. A horizontal dashed line has been added to FIG. 3 to highlight the position of the diaphragm, and it can be seen that after registration, the diaphragm returns to the same position as in the target image. In the sixth column, a slice of the deformation field is shown, and large deformations are shown at the right part of FIG. 3, these areas correspond to the white areas of the difference image in the fourth column.

From the above surface, the random decomposition algorithm proposed by the present disclosure is effective and improves the training quality of deep neural networks in large-deformation lung CT image registration tasks.

In certain embodiments of the present disclosure provide a computer system, comprising a memory, a processor and a computer program stored on the memory, the processor executes the computer program to implement a training method of a neural network model for CT image registration described above.

The computer system can be a server or a terminal. The server can be an independent physical server or a terminal. It can be a server cluster or distributed system composed of multiple physical servers, or it can provide cloud services, cloud databases, cloud computing, cloud functions, cloud storage, network services, cloud communications, middleware services, domain name services, security services, CDN, and cloud servers for basic cloud computing services such as big data and artificial intelligence platforms. The terminal can be a smartphone, tablet, laptop, desktop computer, smart wearable device, etc., but is not limited to this. The terminal and the server can be connected directly or indirectly through wired or wireless communication methods, which is not limited in this disclosure. Those skilled in the art can understand that the above-mentioned computer system structure does not limit the computer system, and may include more or less components, or combine certain components, or arrange different components. The computer system may also include a display unit, etc., which will not be described in detail here. Specifically, in this embodiment, the processor in the computer system will load the executable files corresponding to the processes of one or more disclosure programs into the memory according to the instructions, and the processor will run the executable files stored in the memory so as to implement various functions.

In certain embodiment of the present disclosure provide a computer program product that is configured to implement a training method of a neural network model for CT image registration described above.

The method according to the present disclosure is suitable for solving the large and irregular deformation between the source image and the target image. This problem is the main problem of lung CT registration, and is also common problems in other registration tasks, such as abdominal CT registration, cardiac MRI registration, infant brain image registration, etc.

The stochastic decomposition algorithm according to the method of the present disclosure also has great potential to be applied to these registration tasks. Furthermore, the implementation of the algorithm can be adapted to other disclosure. Agent supervision is introduced to enhance the learning of deformation fields, which can be created in any deep learning paradigm without additional information.

The proposed algorithm can effectively train deep neural networks for large deformation lung CT registration and can encourage practical disclosure of deep neural networks in deformable medical image registration tasks. This random decomposition algorithm according to the present disclosure can be applied to abdominal CT registration tasks, because abdominal organs also have large deformations due to respiratory movements, and are suitable for lung CT registration with large deformations. The algorithm and can be integrated into computer-assisted systems such as image-guided navigation systems and radiotherapy systems The embodiments or elements showcased within this disclosure, including the specific illustrations and materials utilized in examples, are intended to be illustrative, not restrictive. They allow for a wide range of alterations, adjustments, or adaptations that align with the fundamental concept of the present disclosure. It's important to clarify that all depicted diagrams are solely for illustrative purposes; they are neither to scale nor are they precise reproductions of actual devices.

Wherever not already described explicitly, individual embodiments, or their individual aspects and features, described in relation to the drawings can be combined or exchanged with one another without limiting or widening the scope of the described disclosure, whenever such a combination or exchange is meaningful and in the sense of this disclosure. Advantages which are described with respect to a particular embodiment of present disclosure or with respect to a particular figure are, wherever applicable, also advantages of other embodiments of the present disclosure.

What is claimed is:

1. A training method of a deep neural network model for CT image registration, comprising the following steps:

providing features of a source image and features of a corresponding target image, wherein the source image is a CT image;

generating a deformation field from the source image to the target image by inputting the features of the source image and the features of the target image into the deep neural network model;

decomposing the deformation field into a first deformation field part and a second deformation field part through a decomposition value sampled from uniform distribution, wherein the first deformation field part is produced through by multiplying the decomposition value to the deformation field, and the second deformation field part is produced through multiplication and linear interpolation;

obtaining a first registration result and a second registration result by registering the first deformation field part and the second deformation field part, wherein the first registration result is formed by performing a first registration process on the source image by using the first deformation field part, the second registration result is formed by performing a second registration process on the first registration result by using the second deformation field part;

generating a surrogate image by using the source image, the target image and random continuous uniform distribution;

obtaining a total loss function by using the first registration result, the second registration result and the surrogate image, and inputting the total loss function into the deep neural network model to calculate the gradient of the total loss function with respect to the parameters of the deep neural network model, and adjusting the parameters of the deep neural network model by means of minimizing the total loss; and repeating the above steps until a predetermined number of iterations is achieved, so as to obtain the final deep neural network model.

2. The training method according to claim 1, characterized in that the features of the source image represent an intensity $I_S$ of the source image, and the features of the target image represent the intensity $I_T$ of the target image, wherein $I_S \in R^{H \times W \times C}$, $I_T \in R^{H \times W \times C}$, wherein H and W represent the height and width of image, and C represents the number of channels of the deep neural network.

3. The training method according to claim 2, characterized in that:

the first deformation field part $\Phi_1$ is produced by multiplying the decomposition value $\xi$ to the deformation field $\Phi$, wherein $\xi$ represents the decomposition value that sampled from uniform distribution U (0,1), for point p, $$\Phi_1(p) = \xi \cdot \Phi(p),$$

the second deformation field part $\Phi_2$ is produced through multiplication and linear interpolation according to the followings, for the second deformation field part $\Phi_2$ (p) for the point p, $$\Phi_2(p) = (1 - \xi) \cdot \Phi(p) \circ \xi \cdot \Phi(p) =$$
$$\sum_{q \in N(p)} (1 - \xi) \cdot \Phi(q) \prod_{d \in \{x,y,z\}} (1 - |p_d - q_d|)$$

wherein p represents the pixel point on the source image, N (p) represents the neighbors of pixel point p on the source image, d represents dimensions of the spatial domain of the motion field regarding image; x, y, z represent the direction of the Cartesian coordinate system, q means a neighbor point of p, and the symbol "∘" represents the interpolation operation using Spatial transformation layer execution.

4. The training method according to claim 3, characterized in that, the first registration result $$I_R^\xi$$

is obtained by performing a deformation operation $T(I_s | \Phi_1)$ on the source image $I_s$ through the first deformation field $\Phi_1$ obtained in the previous step.

5. The training method according to claim 4 characterized in that, the second registration result $$I_R^{1-\xi}$$

is obtained by performing the deformation operation $$T(I_R^\xi | \Phi_2)$$

on the first registration result $$I_R^\xi$$

through the second deformation field $\Phi_2$ obtained in the previous step.

6. The training method according to claim 3, characterized in that the intensity feature of the surrogate image $I_\xi$ is set as, $$I_\xi = \xi \cdot (I_T - I_s) + I_s,$$

wherein $\xi$ represents the decomposition value that sampled from uniform distribution U (0,1).

7. The training method according to claim 6, characterized in that, the supervision is further set as $$\|I_T - I_R^{1-\xi}\|^2$$

for determining the calculation effect.

8. The training method according to claim 7, characterized in that the total loss function $L_{total}$ is the weighted sum of the similarity loss $L_{sim}$ and the regularization loss $L_{reg}$, wherein $$L_{total} = L_{sim} + \lambda L_{reg}$$

$$L_{sim} = \frac{1}{|\Omega|} \sum_{p \in \Omega} [\|I_T - I_R^{1-\xi}\|^2 + \|I_\xi - I_R^\xi\|^2],$$

$$L_{reg} = \frac{1}{|\Omega|} \sum_{p \in \Omega} \|\nabla \Phi(p)\|^2,$$

wherein $\Omega$ is the domain on which the target image, second registration result, surrogate image and first registration result are defined,
wherein p denotes a pixel in $\Omega$,
wherein $|\Omega|$ is the number of pixels in $\Omega$, and
wherein $\lambda$ is the regularization parameter to balance the contributions of similarity loss $L_{sim}$ and regularization loss $L_{reg}$.

9. The training method according to claim 8, characterized in that, an optimization algorithm is used to adjust the parameters of the deep neural network model in a manner that minimizes the total loss function.

10. The training method according to claim 2, characterized in that the deep neural network f is trained by solving the following function:

$$\hat{f} = \operatorname*{argmin}_{f \in F} E_{(I_S, I_T)} \left[ \|I_T - T(I_S | \Phi_f)\|^2 \right]$$

wherein $\hat{f}$ is the deep neural network after training, F represents the function space of f, $\Phi_f$ refers to the deformation field, T represents transforming the source image using the deformation field, E refers to the expectation operation, and $\operatorname{argmin}_{f \in F} E_{(I_S, I_T)}$ denotes the function $f \in F$ that minimizes the expected loss over all candidate functions in F.

11. The training method according to claim 1, characterized in that, the source image and the target image are pre-processed, the pre-processing includes at least one of image re-sample, pre-affine registration, and image crop.

12. The training method according to claim 1, characterized in that, the deep neural network for learning is a 3D U-Net convolutional neural network, applying 3D convolutions in both the encoder and decoder stages using a kernel size of 3, and a stride of 2.

13. The training method according to claim 12, characterized in that, each convolution is followed by a LeakyReLU layer with parameter 0.2.

\* \* \* \* \*